W. P. & S. G. THOMSON.
NUT LOCKING WASHER.
APPLICATION FILED FEB. 17, 1911.
1,016,798.
Patented Feb. 6, 1912.
3 SHEETS—SHEET 1.
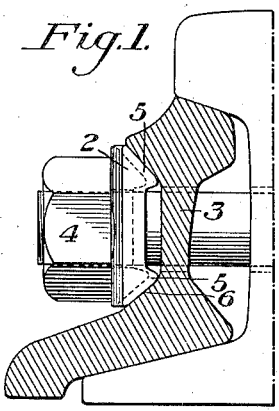
Fig.1.
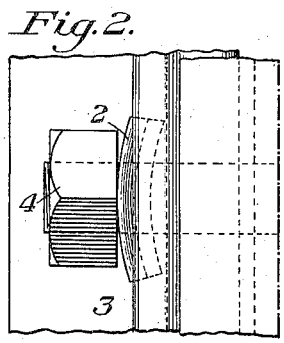
Fig.2.
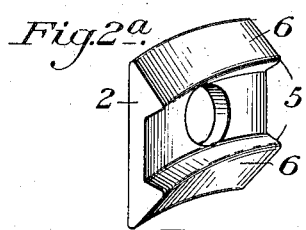
Fig.2ª.
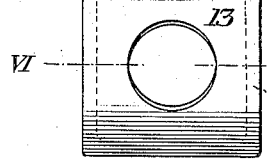
Fig.6.
Fig.6ᵇ.
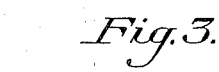
Fig.3.
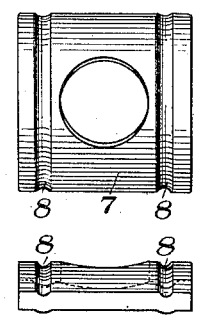
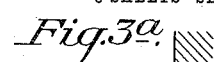
Fig.3ᵇ.
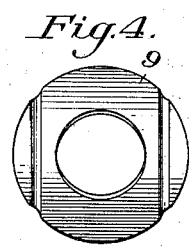
Fig.4.
Fig.4ª.
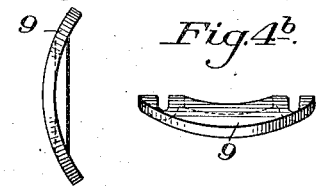
Fig.4ᵇ.
Fig.5.
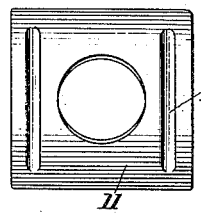
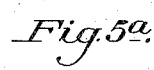
Fig.5ª. Fig.5ᵇ.
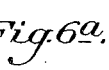
Fig.6ª.
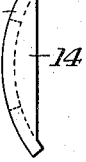
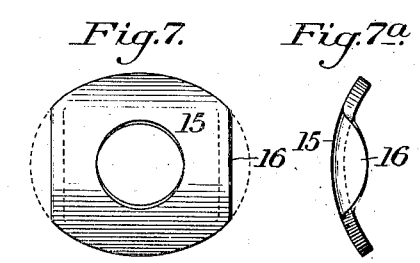
Fig.7. Fig.7ª.
Fig.7ᵇ.
WITNESSES
R A Balderson
W Famaries
INVENTORS
W. P. Thomson
S. G. Thomson
by Bakewell, Byrnes & Parmelee
Attys.

W. P. & S. G. THOMSON.
NUT LOCKING WASHER.
APPLICATION FILED FEB. 17, 1911.
1,016,798.
Patented Feb. 6, 1912.
3 SHEETS—SHEET 2.
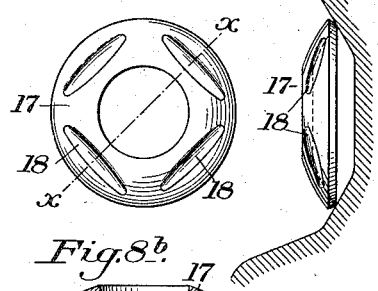
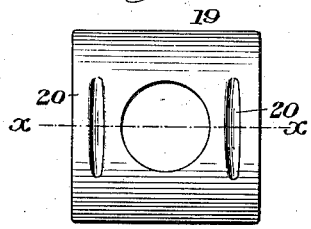
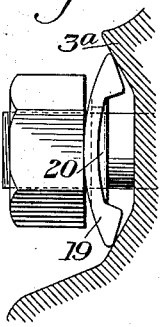
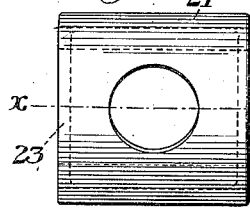
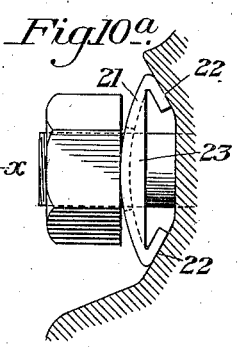
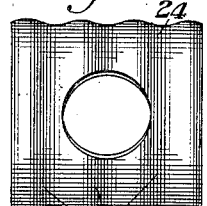
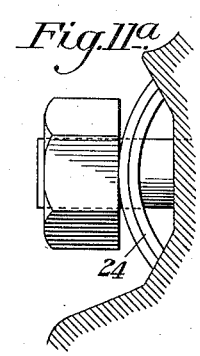
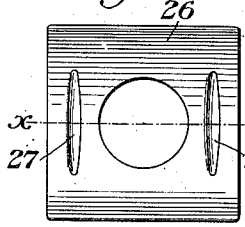
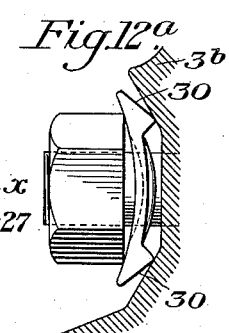
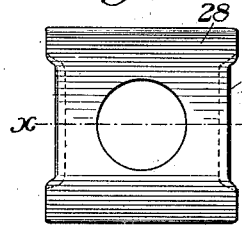
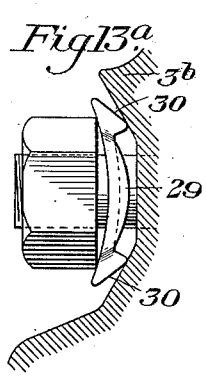
WITNESSES
INVENTORS
W. P. Thomson
S. G. Thomson
by Bakewell, Byrnes & Parmelee
Attys.

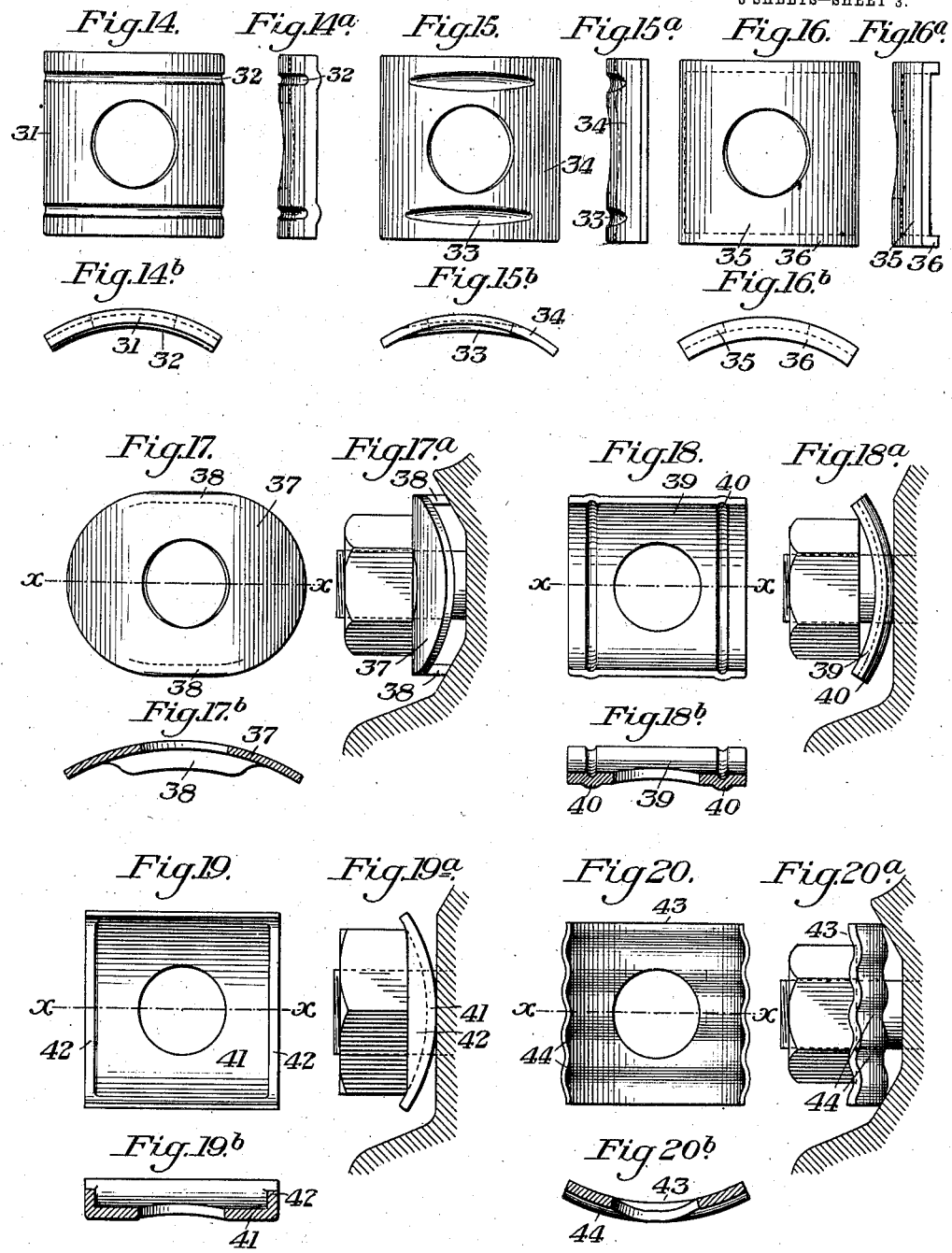

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

NUT-LOCKING WASHER.

1,016,798. Specification of Letters Patent. Patented Feb. 6, 1912.

Application filed February 17, 1911. Serial No. 609,232.

*To all whom it may concern:*

Be it known that we, WILLIAM P. THOMSON and SAMUEL G. THOMSON, both residents of Philadelphia, in the county of Philadelphia and State of Pennsylvania, have invented a new and useful Improvement in Nut-Locking Washers, of which the following is a full, clear, and exact description, reference being had to the accompanying drawings, forming part of this specification, in which—

Figure 1 is a vertical section showing one form of our invention as applied to the splice bar of a rail joint; Fig. 2 is a plan view of the same; and Fig. 2ª is a perspective view of the washer; Fig. 3 is a plan view of a rectangular washer of modified form; Fig. 3ª is a side view showing the same applied between the nut and bearing surface; and Fig. 3ᵇ is an end view of the washer; Figs. 4, 4ª and 4ᵇ are, respectively, plan side and edge views of another form of washer. Figs. 5, 5ª and 5ᵇ are similar views of another form; Fig. 6 is a plan view, Fig. 6ª an edge view; and Fig. 6ᵇ a section on the line VI—VI of Fig. 6, showing another form; Figs. 7, 7ª and 7ᵇ are views respectively similar to Figs. 6, 6ª and 6ᵇ of still another form; Fig. 8 is a plan view of another form; Fig. 8ª a side view of the same applied to a bearing surface; and Fig. 8ᵇ is a section of the washer on the line x—x of Fig. 8. Figs. 9, 9ª and 9ᵇ are views similar respectively to Figs. 8, 8ª and 8ᵇ of still another form; Figs. 10, 10ª and 10ᵇ are views similar respectively to Figs. 9, 9ª and 9ᵇ of still another form; Fig. 11 is a plan view of another form; Fig. 11ª a side view showing the same applied; and Fig. 11ᵇ an end view thereof; Figs. 12 and 12ª are views similar to Figs. 11 and 11ª, respectively, showing still another form; and Fig. 12ᵇ is a section on the line x—x of Fig. 12; Figs. 13, 13ª and 13ᵇ are views similar to Figs. 12, 12ª and 12ᵇ showing another modification; Figs. 14, 14ª and 14ᵇ; Figs. 15, 15ª and 15ᵇ; and Figs. 16, 16ª and 16ᵇ show in plan, side and end views, respectively, three other forms; Figs. 17, 17ª and 17ᵇ; Figs. 18, 18ª and 18ᵇ; Figs. 19, 19ª and 19ᵇ; and Figs. 20, 20ª and 20ᵇ show in plan, side elevation and section four other forms of the washer, Figs. 17ᵇ, 18ᵇ, 19ᵇ and 20ᵇ being sections on the lines x—x of Figs. 17 to 20, respectively.

In our Patent No. 968,500 of August 23, 1910, for rail joint, we have described and claimed the use in connection with the joint bolts, of a bridge plate forming a bearing for the joint bolt nuts or heads, and which serves to transmit the bolting strains around the web of the splice bar to its head and foot portions. Our present invention has been more particularly designed to provide a plate adapted for use in a joint of this character and for this purpose, with the further object of constructing said plate to act as a locking washer for the bolt nuts. Our invention is not, however, limited to a plate or washer for this use, but also provides a nut-locking washer which is capable of general use.

It is well known that a bent washer affords greater resistance to the turning of a nut after the washer has been tightly compressed by the nut, than can be afforded by a plain flat washer, and the prior art discloses various styles and shapes of curved or bent washers intended to afford sufficient resistance to prevent a nut from turning, without resorting to the use of teeth or cutting edges or the use of portions of the washer to engage the wrench-gripping faces of the nut. Our invention is designed to provide an improved washer of this character, in which more efficient results may be obtained with the expenditure of an equal amount of or less metal.

We have also designed to simplify the manufacture and to provide means for reinforcing the bridge plate or spring washer in such a way as to make it practicable to use a much thinner plate with a much greater resistance than has heretofore been possible in the use of bent washers of this general type.

In the accompanying drawings, we have shown a variety of different modifications, of which our invention is susceptible, but it will be understood that these are illustrative only, and that the broader features of the invention, as set forth in the appended claims, may be further modified, without departing from the spirit and scope of our invention, as defined in said claims.

In the form of the invention shown in

Figs. 1, 2, 2ª, the plate or washer 2 is of rectangular form bent with respect to a central vertical axis to give it a concave inner face to bear against the splice bar 3, and the convex nut-bearing outer face.

4 designates the nut.

The plate is reinforced on its inner face by the top and bottom ribs 5, having the bevel surfaces 6, to bear against the inclined outer faces of the head and foot portions of the splice bar.

Figs. 3, 3ª and 3ᵇ show a plate or washer 7, of rectangular form, having a horizontal axis of curvature and a concave splice bar bearing surface and a convex nut-bearing surface, and provided with vertical reinforcing ribs or corrugations 8, preferably pressed or stamped therein and running entirely across the concave face.

The plate or washer 9 of Figs. 4, 4ª and 4ᵇ is of circular form also bent along a horizontal axis of curvature to give concave and convex faces, and having the reinforcing ribs or corrugations extending vertically across the concave face.

In Figs. 5, 5ª and 5ᵇ, the plate or washer 11 is of rectangular form with concave and convex faces, with corrugations or truss-like depressions 12, running vertically part way across its faces, these corrugations or depressions being at right angles to the axis of curvature.

In Figs. 6, 6ª and 6ᵇ, the plate or washer 13 is also rectangular in form with its end portions bent inwardly in the direction of the concave face, as shown at 14, to form reinforcements running at right angles to the axis of curvature.

In Figs. 7, 7ª and 7ᵇ, the plate or washer 15 is of elliptical form with its ends bent inwardly, as shown at 16, to provide truss-like reinforcements extending at right angles to the axis of curvature.

Figs. 8, 8ª and 8ᵇ show a plate or washer 17 of circular form with a plurality of reinforcing corrugations 18, each running part way across the curved face and in a general tangential direction. This plate is bent to have a generally spherical curvature.

In the form shown in Figs. 9, 9ª and 9ᵇ, the plate or washer 19 is of rectangular form with reinforcing corrugations 20, running vertically across the horizontally cambered portion of the plate, which spans the web of the splice bar, as shown in Fig. 9ª.

Figs. 10, 10ª and 10ᵇ show the plate or washer 21 as of rectangular form and it is not only bent along a horizontal axis of curvature into concavo-convex form to afford spring resistance to the nut, but also has its edge portions 22 bent inwardly to give yielding bearings on the head and foot portions of the splice bar, and thus greatly increase the resiliency of the plate. The vertical edges of the plate are also bent inwardly, as shown at 23, to resist the straightening-out tendency of the horizontally cambered portions of the plate.

Figs. 11, 11ª and 11ᵇ show a rectangular plate or washer 24, bent along a horizontal axis of curvature, and having a plurality of vertically extending corrugations 25.

Figs. 12, 12ª and 12ᵇ show another form of rectangular plate or washer 26, bent along a horizontal axis of curvature and having truss-like depressed portions or corrugations 27, running vertically part way across the concave face.

In the form shown in Figs. 13, 13ª and 13ᵇ, the rectangular plate 28 is bent along a horizontal axis of curvature and has portions of its vertical edges turned inwardly, as shown at 29, to form truss reinforcements. In the form shown in these three figures, as well as in the form shown in Figs. 12, 12ª and 12ᵇ, the plates or washers are placed with their concave faces toward the nuts and the upper and lower edge portions of the plate are beveled on the reverse side, as shown at 30, for bearing against the beveled seating faces of the splice bars 3ᵇ.

In the form shown in Figs. 14, 14ª and 14ᵇ, the plate 31 is bent with respect to a central vertical axis and has transverse reinforcing corrugations 32, running entirely across the concave face.

The form shown in Figs. 15, 15ª and 15ᵇ is similar to that of the last three figures, except that the reinforcements 33 run only partially across the plate 34, and are shown as of a form which is widest at the center and tapering toward its ends.

The plate 35, shown in Figs. 16, 16ª and 16ᵇ, is a cambered plate bent with respect to a central vertical axis, with its top and bottom edges bent inwardly, as shown at 36, to form the reinforcements.

Figs. 17, 17ª and 17ᵇ show a plate or washer 37, bent along a vertical axis of curvature and of oblong form with its horizontal top and bottom edges 38 bent inwardly to form reinforcing bearings when applied to the outer face of a splice bar, as shown in Fig. 17ª.

Figs. 18, 18ª and 18ᵇ show a generally rectangular plate or washer 39, bent along a horizontal axis of curvature and having vertical reinforcing corrugations 40, running entirely across the concave face, the washer being shown in Fig. 18ª as applied with its concave face toward the nut.

In Figs. 19, 19ª and 19ᵇ, the plate 41 is of rectangular form, bent with respect to a central horizontal axis, and having its vertical edges bent outwardly, as shown at 42, to form reinforcements which run nearly all the way across its concave face, and which greatly increase the resistance of the plate being flattened out.

Figs. 20, 20ª and 20ᵇ show a spring plate 43, which is bent along a vertical axis of curvature and is provided with a plurality of horizontally extending corrugations 44. While in certain of the figures, we have shown the plates and washers as applied with the convex face toward the nut and in others we have shown the convex face toward the splice bar, it is immaterial in the use of the washers whether they be convexly or concavely formed with reference to either one of the particular bearing faces. It will also be understood that the principle of our invention will be present even when the bending is of angular form, so that a curved conformation is approximated.

In all the forms shown, the plate or washer is one which has one convex face and one concave face with a reinforcement or reinforcements which greatly increase its resistance to flattening pressure and enables the use of relatively thin metal for a given resistance.

As before stated, while we have illustrated and described the invention more particularly with reference to its use in connection with splice bars, it is to be understood that the invention is equally adapted for use in connection with any type of bolt-clamped material.

We claim:

1. A spring washer having a curved face and a rib or flange extending across said face to partially resist said washer from flattening out when it is clamped into a tightened position, substantially as described.

2. A spring washer having a curved face and a rib or corrugation across said face at an angle to the axis of said curvature, substantially as described.

3. A spring washer having an upright convex bearing face for a nut, said washer being bent along vertical axes and having a horizontally extending stiffening rib, substantially as described.

4. In a rail joint, a splice bar, a clamping bolt and nut, and a spring washer which is bent so that in its untightened position, it has a portion of its inner face standing free from a portion of the outer face of said splice bar, said washer being traversed by an integral reinforcement disposed at an angle to the axis of curvature and acting to increase the tensile resistance of the washer to compression, substantially as described.

In testimony whereof, we have hereunto set our hands.

WILLIAM P. THOMSON.
SAMUEL G. THOMSON.

Witnesses:
McLeod Thomson,
Morris L. Kolb.